United States Patent Office 2,747,552
Patented May 29, 1956

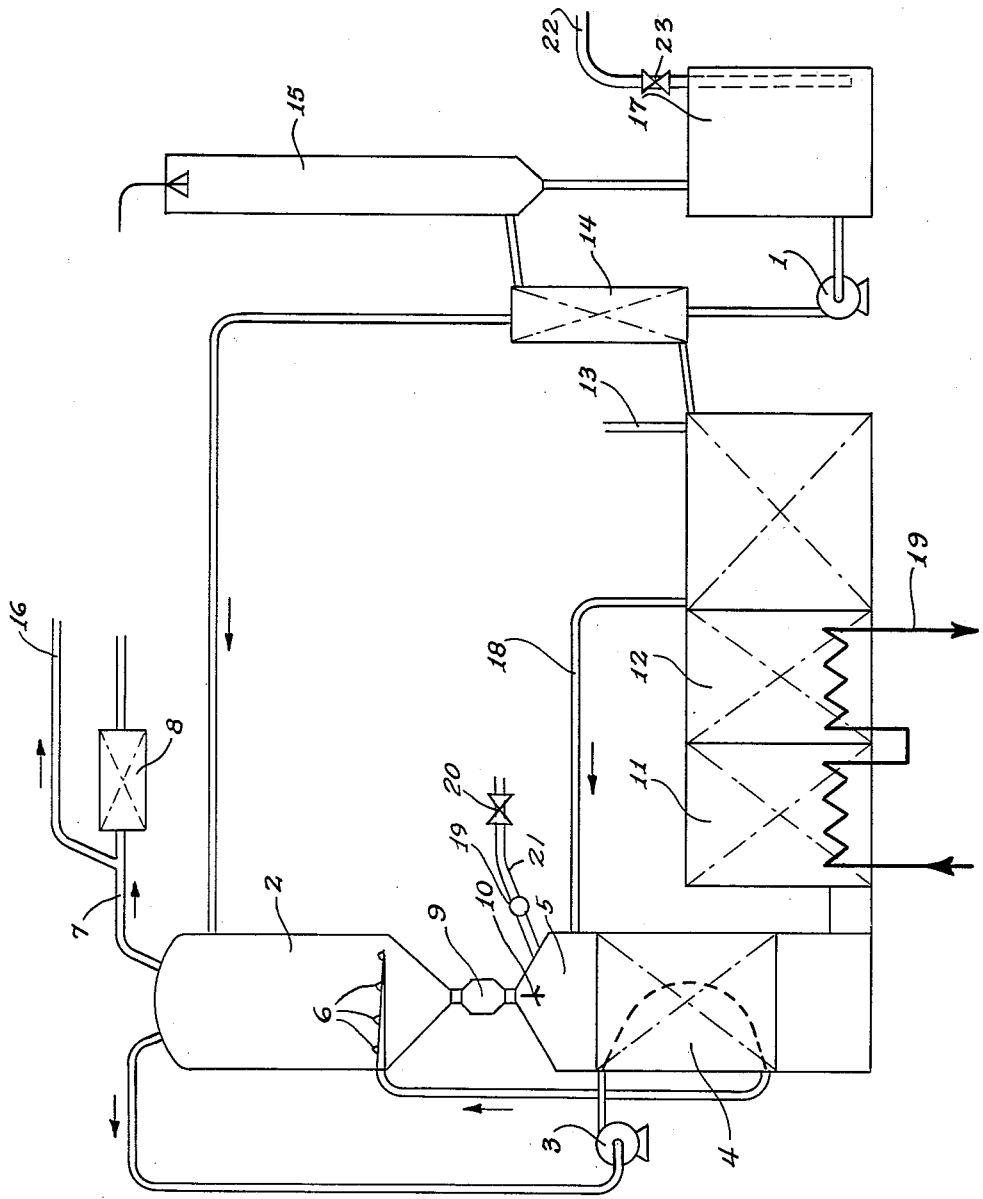

2,747,552

METHOD OF GENERATING VAPOUR FROM WASTE SULFITE LIQUOR OR DREGS

Gunnar Kyrklund, Kuusankoski, Finland

Application April 5, 1952, Serial No. 280,831

7 Claims. (Cl. 122—31)

All prior known methods of utilizing the heat derived by combustion of waste sulfite liquor are based on the principle of separately evaporating waste liquor to provide fuel usable singly or as supplementary fuel in firing steam boilers. Such prior art evaporating equipment and methods require high initial first cost and entail excessive operating costs while the calorific value of the waste liquors cannot be utilized effectively to a satisfactory degree. As is known even from the most modern multiple effect evaporators notable amounts of heat escape with condensate or flue gases issuing from the last stage while heat of low value can be partially utilized in exceptional cases only.

In contrast to prior known methods employing such multiple effect evaporators, the present invention is concerned primarily with a method of directly utilizing vapour generated from waste sulfite liquor with omission of the roundabout way via a special steam boiler. Under the principle of the invention and in consequence thereof no vapour escapes unutilized and upon directly applying the vapour e. g. for cooking purposes no losses in form of condensate of low calorific value will appear. Even losses due to radiation of heat are reduced appreciably on the basis of the small equipment dimensions necessary for carrying out the invention.

According to the invention the method of generating vapour from waste sulfite liquor or dregs which vapour can be used directly or indirectly, e. g. for cooking cellulose or for other purposes, is chiefly characterized in that after the application of necessary starting heat to a unit, substantially consisting of a vapour generating vessel fed continuously with waste liquor and having a combustion section directly connected thereto, vapour is generated by continuous introduction of combustible liquor from the vapour generating vessel into the combustion section and burnt therein for giving off the heat necessary in the vapour generating vessel for the generation of vapour and concurrent production of new combustible liquor.

The invention will be described more fully hereinbelow with reference to the accompanying drawing wherein there is disclosed an embodiment of this inventive concept.

Into an evaporation vessel 2 is fed combustible waste sulfite liquor having high dry matter contents and originating from earlier cooks and is advantageously via a sludge separator 9 conducted to a burner section 5 of said evaporation vessel 2 to be burnt in a burner 10. The generated starting heat—which may be helped by fuel burned in the combustion chamber by means of a burner 19 to which the fuel is introduced through the operating valve 20 and feeding line 21—is utilized for concentrating fresh, preferably preheated waste sulfite liquor, fed from a liquor tank 17 to the evaporation vessel 2 by means of a pump 1. The liquor may be preheated, e. g. by means of a preheater 14. The combustion heat from the burner 10 is transmitted to the liquor in the evaporation vessel 2 by means of vapour generated from said liquor and withdrawn into a circulation fan 3 and passed through a superheater 4 arranged in the burner section 5 whereinto preheated air for combustion is introduced via a line 18, after which the vapour is returned through nozzles 6 into the evaporation vessel 2 where they give up their heat content to the liquor. The waste liquor thus evaporated in the evaporating vessel 2 to a dry matter content of, e. g. from 50% to 55% is now run continuously from the bottom of the evaporation vessel 2 to the burner 10 and burnt, after the supply of starting heat is shut off, by means of the valve 20 to give off heat necessary for generating vapour while introducing new amounts of combustible liquor requisite therefore into the evaporation vessel 2 wherein a pressure of, e. g., 20 atmospheres is maintained. Surplus vapour from the evaporation vessel 2 is then passed through a line 7 to a heat exchanger 8 or directly to the digestion step by way of line 16.

Gases of combustion in the burner section 5 flow after passage through the superheater 4, via a waste heat boiler 11 to a vapour superheater 12 wherefrom superheated vapour is withdrawn at 19, and serves ultimately to preheat combustion air drawn in at 13 or weak liquor in a preheater 14. The ash particles in the burner gases are finally removed by means of spray tower 15 which advantageously may be fed with raw liquor, whereby a certain neutralization effect of said liquor is attained which is desirable in many instances. In starting operation it is possible, as has already been mentioned, to preheat the burner section even with, e. g., oil and/or gas.

Since waste liquor derived from cooks of viscose pulp or the like specific cooks has an appreciably higher dry matter content than liquor from normal kraft pulp cooks more heat is generated in burning the combustible liquor obtained on evaporating said liquor than is necessary for vaporizing the same. Then it is possible to withdraw, if so desired, and without deleteriously influencing liquor vaporization, a part of the liquor concentrated in the evaporating stage and utilize the same for other purposes, e. g. as binders, road binder liquor, etc. A part of the thus withdrawn liquor should advantageously be stored to serve as starting fuel after possible stops in operation.

The above example discloses generation of vapour when the unit is charged with waste sulfite liquor or dregs only. The method is also applicable in cases where solid fuel such as peat in sufficiently finely divided form is used, by way of example as follows:

Into the evaporation vessel is introduced normal waste liquor and said vessel is preheated with oil burnt in an oil burner mounted in the burner section. Evaporation having proceeded to the degree that concentrated liquor obtained from the bottom of the evaporation vessel is combustible, the same is run into the liquor burner and the oil supply shut off, after which liquor evaporation proceeds in manner similar to that described above. Now 40% finely divided peat is introduced into the liquor tank 17 by means of the pipe 22 which is provided with an operating valve 23 therein. The dry matter content of the peat is about 12%. Vapor generation continues as before. The dry matter content of concentrated liquor issuing from the evaporation vessel is maintained at a concentration most suitable for burning by the addition of regulated amounts of weak liquor to the evaporation vessel so as to render continuous operation possible.

Nor is the fuel which can be admixed with the liquor limited to peat or to the hereinabove given percentages but is quite independent of the initial dry matter content, composition, consistency etc. of the liquor or solid fuel.

Moreover, attention is drawn to the fact that possible burning of oil or other fuel in the combustion section concurrently with burning of liquor in no way affects liquor evaporation but only serves to increase the load

What I claim is:

1. The method of generating vapour from waste sulfite liquor and dregs, which comprises, introducing a quantity of said liquor into an evaporating chamber, heating said waste liquor to drive off vapour therefrom and to leave combustible liquid remaining, drawing off said combustible liquid from said evaporation chamber, burning said combustible liquid in a combustion chamber, drawing off the vapour generated in said evaporation chamber and superheating said vapour by passing the vapour through said combustion chamber, introducing additional waste liquor into said evaporating chamber and heating said additional waste liquor to drive off vapour therefrom by introducing said superheated vapour into the evaporator in heat exchange relationship with said additional waste liquor.

2. The method as in claim 1 and including burning previously concentrated combustible liquid in the combustion chamber as the starting fuel to start the operation.

3. The method as in claim 1 and including burning a common fluid fuel in the combustion chamber to start the operation.

4. The method as in claim 1 and including withdrawing part of the combustible liquid prior to combustion for use for other purposes.

5. The method as in claim 1 and including adding solid fuel in the waste liquid.

6. The method as in claim 5 wherein said solid fuel is peat.

7. The method as in claim 1 and including conducting combustion products from the combustion chamber and passing them in heat exchange relationship with the waste liquor for preheating subsequent waste liquor.

References Cited in the file of this patent

UNITED STATES PATENTS

| Number | Name | Date |
|---|---|---|
| 130,613 | Wentworth | Aug. 20, 1872 |
| 218,056 | Nixon | July 29, 1879 |
| 237,113 | Lee | Feb. 1, 1881 |
| 424,755 | Blackman | Apr. 1, 1890 |
| 424,756 | Blackman | Apr. 1, 1890 |
| 726,036 | Drewsen | Apr. 1, 1903 |
| 1,326,414 | Moore | Dec. 30, 1919 |
| 1,500,890 | Plumstead | July 8, 1924 |
| 1,743,080 | Bradley | Jan. 7, 1930 |
| 1,900,320 | Wagner | Mar. 7, 1933 |
| 1,961,351 | Gustin | June 5, 1934 |
| 2,064,953 | Serpas | Dec. 22, 1936 |
| 2,303,811 | Badenhausen | Dec. 1, 1942 |
| 2,535,730 | Gadret | Dec. 26, 1950 |
| 2,550,676 | Dalin | May 1, 1951 |